INVENTOR.
RICHARD L. SNYDER,
BY
Walter J. Adam
ATTORNEY.

INVENTOR.
RICHARD L. SNYDER,
BY
Walter J. Adam
ATTORNEY.

INVENTOR
RICHARD L. SNYDER,
BY
Walter J. Adam
ATTORNEY.

United States Patent Office 3,351,922

Patented Nov. 7, 1967

3,351,922

COLLAPSING DOMAIN MAGNETIC MEMORY

Richard L. Snyder, Fullerton, Calif., assignor to Hughes Aircraft Company, Culver City, Calif., a corporation of Delaware Filed Oct. 31, 1963, Ser. No. 320,295
4 Claims. (Cl. 340—174)

ABSTRACT OF THE DISCLOSURE

A memory system including a plurality of magnetic wires having magnetized bias regions spaced therealong and magnetic domains established in storage regions of the same polarity or of the opposite polarity from that of adjacent bias regions respectively representing first and second magnetic stages. For reading, a first propagating field changes all domains along a selected wire to the first state and during writing, short collapsible domains are established in a row of storage regions. A short domain is expanded to include the storage region only in the presence of a second propagating field. In unselected storage regions, an effective infinite discrimination is provided.

This invention relates to memory systems and particularly to a highly reliable magnetic memory in which information stored in unselected storage elements is substantially undisturbed during interrogation and storage operations.

One of the problems associated with magnetic memories is to provide sufficient current discrimination between cores selected to be switched and cores that are unselected but to which currents are applied because of the arrangement of the selection system. For example, in coincident type memories, currents of half amplitude of that required to switch selected cores are applied to many unselected cores in corresponding rows and columns. In order to prevent unselected cores from being switched to opposite states, the cores of these memories must be carefully selected as to hysteresis characteristics and the switching currents must be amplitude regulated to a relatively high degree of accuracy. Also, in some conventional arrangements, the unselected cores develop undesired noise signals in the sense lines during reading operations. With word organized selection systems, which only pass currents of one-third of the amplitude required for switching, through conductors coupled to unselected cores, the same problems exist as to erroneous destroying of information except to a slightly lesser degree. Thus, the discrimination ratio or selection ratio in a memory operation which is a ratio of the current required to switch a core to the maximum current that is applied to cores that are not selected to be switched and that may be permanently disturbed, is an important characteristic of a memory system. A three to one discrimination ratio, at least for recording operations, is utilized in some conventional systems, which ratio is far from being completely satisfactory. A memory system which operates on a principle that prevents unselected storage elements from being permanently disturbed, would be a highly desirable advance to the computer art.

It is therefore an object of this invention to provide a memory storage system that effectively has an infinite selection or discrimination ratio, that is, unselected storage elements may not be permanently disturbed.

It is a further object of this invention to provide an arrangement in which magnetic propagating fields and switching fields are combined to form a reliable and simplified memory system.

It is a still further object of this invention to provide a storage system in which binary information is recorded in selected storage elements by a combination of an arrangement to establish a relatively short and unstable magnetic domain and an arrangement to apply a propagating field thereto to expand the short domain to a stable length.

It is another object of this invention to provide a magnetic storage system utilizing a "snap back" principle of relatively short magnetic domains having insufficient magnetic retentivity to sustain themselves in a stably magnetized region of opposite polarity so that only storage elements to which propagating fields are applied may be permanently disturbed during a recording operation.

It is still another object of this invention to provide a low cost and highly reliable memory system utilizing magnetic wires for informational storage.

It is another object of this invention to provide a memory system utilizing magnetic wires and a combination of the principles of magnetic domain formation and of propagation of magnetic domain walls so that the reliability characteristics of operation thereof are principally dependent upon the physical geometry of construction.

Briefly, in accordance with the principles of the invention, a memory system is provided in which stable binary storage regions are established along elongated magnetic storage mediums. Stable magnetized biasing regions are also established at both ends of each storage region so that opposite magnetic poles are positioned adjacent to opposite ends of each storage region. In a first magnetic state of a storage region, the stored magnetic domain is an extension of the adjacent bias regions without domain walls therealong and in a second magnetic state of a storage region, the stored domain has domain walls between opposite magnetic poles at both ends of the storage region. During reading, a first magnetic propagating field is applied to all storage regions of a selected medium to change the magnetic domains having domain walls to the first magnetic state. During writing, a second propagating field of opposite polarity from the first propagating field and of insufficient magnitude to establish a second magnetic state without the presence of magnetic domain walls, is applied to all storage elements of a selected medium. As all storage regions are magnetized in the first state, a magnetic switching field is applied to a short length of those storage regions in which the second magnetic state is to be recorded to establish a short magnetic domain in the second magnetic state which in turn is expanded by the propagating field to include the storage region. Without the presence of the propagating field, such as in storage regions of unselected storage mediums, the short magnetic domains established in regions storing the first state and which have a length such that the magnetic retentivity thereof is incapable of supporting the magnetic state, collapse at the termination of the switching field. Thus, because unselected storage elements can not be permanently disturbed because of the nature of the selection operation, an infinite discrimination ratio is effectively provided between the selected and the unselected storage regions.

The novel features of this invention, both as to its organization and method of operation, will best be understood from the accompanying description, taken in connection with the accompanying drawings, in which like reference characters refer to like parts, and in which.

Figure 1:
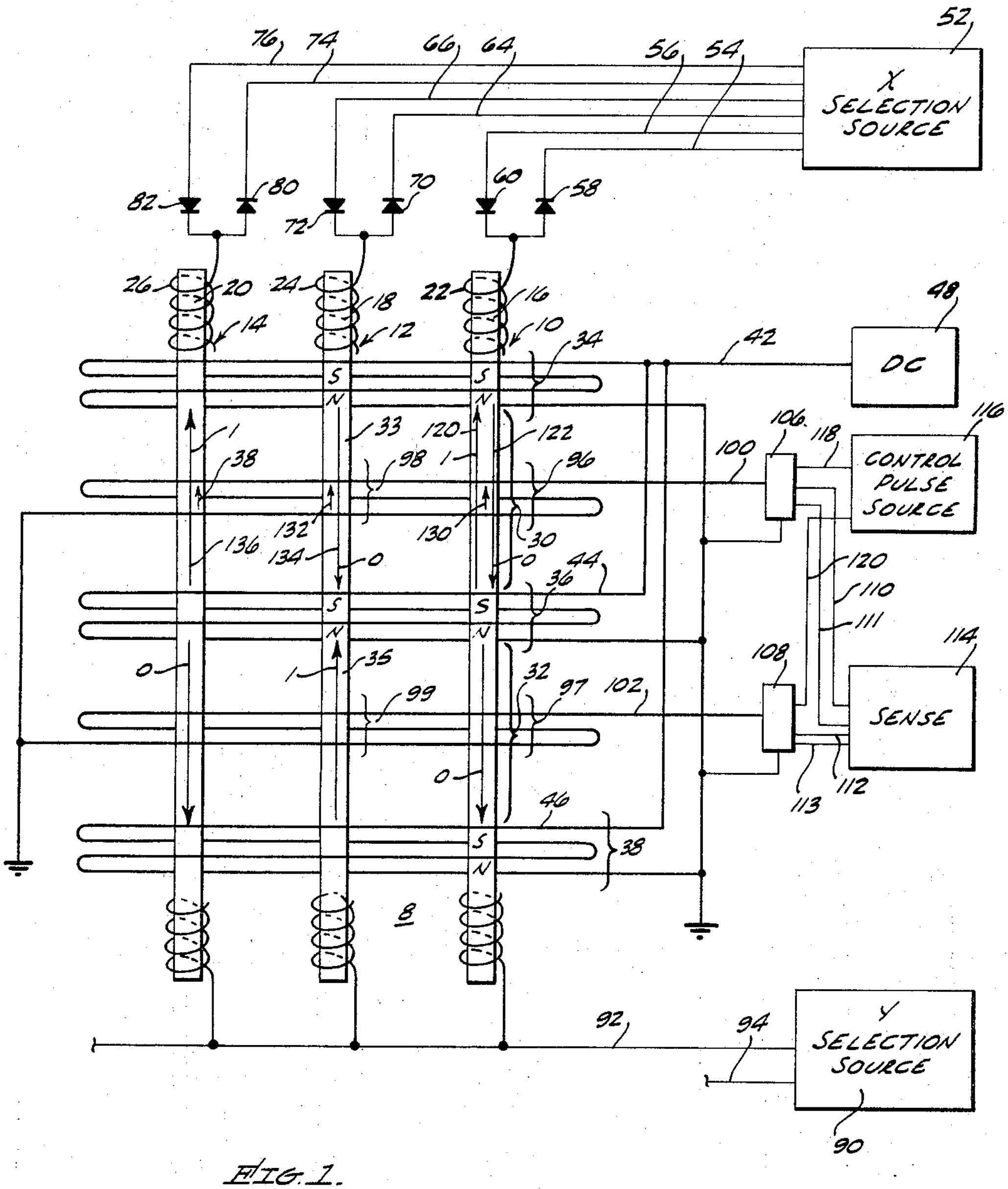
FIGURE 1 is a schematic circuit and wiring diagram showing a memory system in accordance with the principles of this invention.
Figure 2:
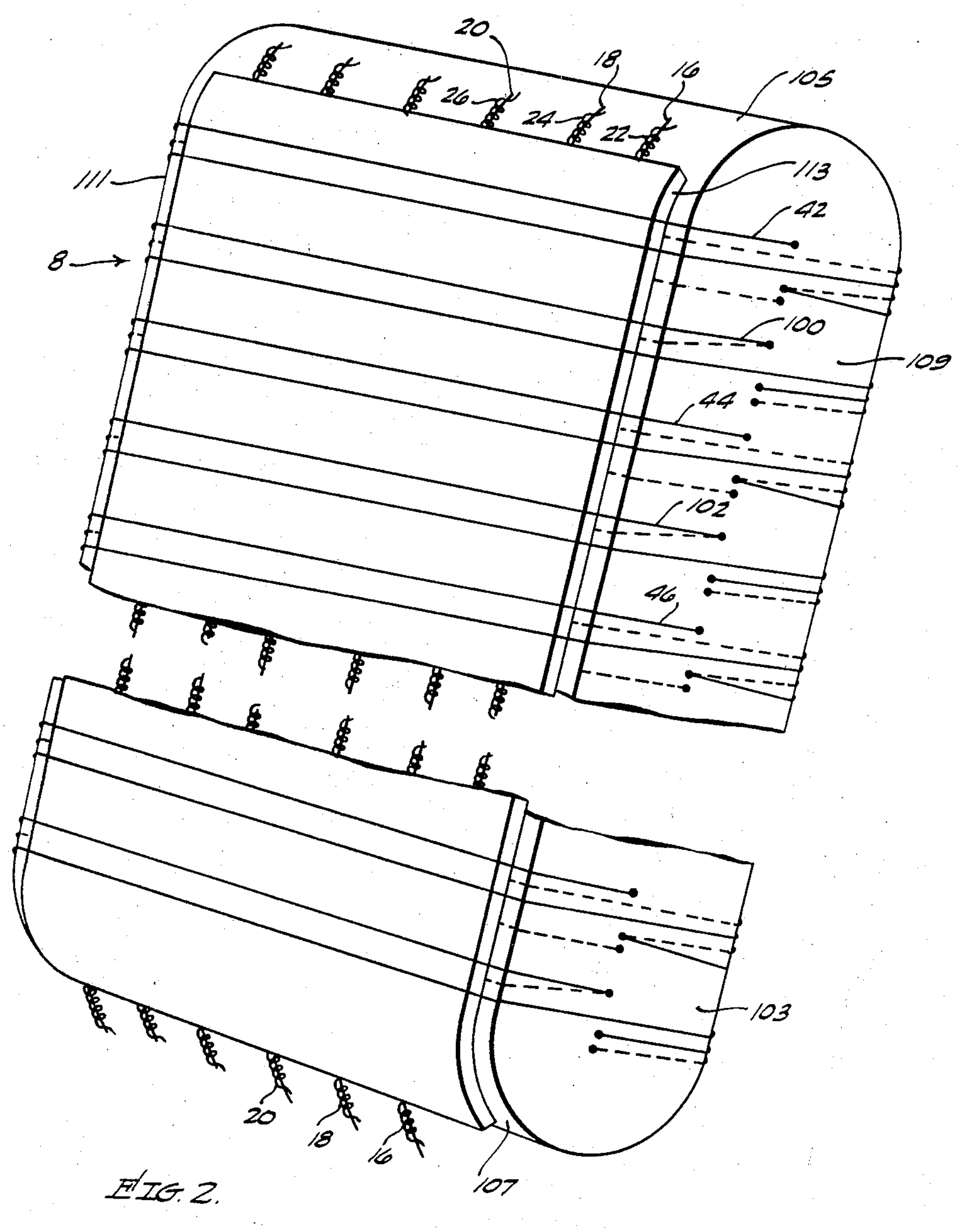
FIG. 2 is a schematic perspective drawing showing the memory system of FIG. 1 wound on an elongated maintaining structure.

Referring now to FIG. 1, an arrangement 8 of the storage and control wires of the memory system in accordance with the principles of the invention is shown which may be woven or positioned on the outer surface of a plate or oval shaped structure such as is shown in FIG. 2. However, it is to be understood that the principles in accordance with the invention are not to be limited to any particular structural arrangement for positioning the storage and the control wires, and other configurations may be utilized such as woven structures formed on conventional wire looms, for example. Also in accordance with the principles of the invention, thin magnetic films may be utilized for the magnetic storage elements and etched or deposited conductors may be utilized for the control wires. The arrangement 8 of FIG. 1 which is shown as a portion of a word organized selection system, includes word storage elements 10, 12 and 14 which in turn respectively include word storage lines 16, 18 and 20 that may be wires of a suitable magnetic material such as an iron-nickel combination. The storage lines 16, 18 and 20 may have the material thereof magnetically oriented along the longitudinal axis thereof. The magnetic material may be considered oriented along the axis when the magnetic dipoles or elements thereof have a preferential direction of alignment therealong, which orientation may be provided by maintaining the storage line under a stress such as axial tension, torsion or axial compression. The stress may in some arrangements be substantially near the yield point of the material, but the invention is not to be limited to any particular stress condition. For some magnetic materials such as thin films, longitudinal orientation for operation of the system in accordance with the invention is provided without a stress condition so that the principles of the invention are applicable to any magnetic material being sufficiently oriented to provide satisfactory operation. An oriented magnetic medium has the property that substantially more magnetomotive force must be applied thereto to establish a magnetic domain in the direction of orientation than is required to propagate a wall of an established magnetic domain in the direction of orientation. The storage lines 16, 18 and 20 may also, in accordance with the principles of the invention, be a material coated with a film or a thin film of magnetic material. Also, in accordance with the principles of the invention, the word lines 16, 18 and 20 are not limited to wires but may be of any desirable configuration and may be of any suitable material such as a ferromagnetic material or a ferrite.

Positioned around each of the magnetic word storage lines 16, 18 and 20 are respective storage conductors 22, 24 and 26 which may be insulated wire of a suitable conductive material such as copper and wound or spun around the corresponding storage lines in a helical or spiral configuration. In response to currents flowing through the conductors such as 22, an axial magnetic field component is applied to the magnetic storage lines such as 16. It is to be noted that although the system of FIG. 1 is shown in a word organized arrangement, the principles of the invention are not to be limited to word organized systems. The storage conductors such as 22 and 24 may be in other forms than wires in accordance with the invention such as etched copper or vapor deposited conducting material.

To establish magnetic storage regions such as 30 and 32 in the storage line 16 and storage regions such as 33 and 35 in the storage line 18, DC (direct current) biasing regions are provided on each side thereof such as the biasing regions 34, 36 and 38. In one arrangement for providing the biasing regions, DC conductors 42, 44 and 46 may be positioned in an appropriate manner to couple the storage elements 10, 12 and 14. Because current flows in opposite directions through adjacent segments of the conductors 42, 44 and 46, alternate horizontal segments thereof are positioned on opposite sides of the storage elements 10, 12 and 14. A DC current source 48 applies current to the DC conductors 42, 44 and 46 in such directions that the poles established in the DC biasing regions 34, 36 and 38 are opposite at each end of the storage regions such as 30 and 32. In some arrangements in accordance with the invention, DC current may be applied in series through the conductors 42, 44 and 46. To provide a consistent pattern in the word organized arrangement of FIG. 1, the DC biasing regions may have repetitive south and north poles starting at the top of the storage elements such as 10. It is to be noted that to provide magnetic isolation between the storage regions such as 30 and 32 during operation, that is, to prevent a change in flux of one storage region from changing flux in the biasing region that may affect the magnetic state of the adjacent storage region, the DC biasing regions such as 36 may be maintained in or substantially in a saturated magnetic state.

The memory system includes an X selection source 52 having leads 54 and 56 respectively coupled through the cathode to anode path of a diode 58 and through the anode to cathode path of a diode 60 to the storage conductor 22. Also, leads 64 and 66 are respectively coupled between the X selection source 52 and the cathode to anode path of a diode 70 and the anode to cathode path of a diode 72 to the storage conductor 24. In a similar manner leads 74 and 76 are respectively coupled from the X selection source 52 through the cathode to anode path of a diode 80 and the anode to cathode path of a diode 82 to the storage conductor 26. It is to be understood that each of the X selection leads such as leads 54 and 56 and leads 64 and 66 may be coupled to a plurality of other storage elements (not shown) for selection in the X direction in a large memory array as is well known in the art. A Y selection source 90 is coupled through a lead 92 to the storage conductors 22, 24 and 26. It is also to be understood that other leads such as 94 may be coupled to the storage conductors of other word storage elements in a large memory array, which elements are not shown for convenience of illustration. Also, the lead 92 may be coupled to a plurality of other storage conductors (not shown) depending upon the size of the array.

Positioned substantially in the center of each of the storage regions such as 30, 32, 33 and 35 are respective recording regions 96, 97, 98 and 99 which are substantially short relative to the length of the corresponding storage region. Conductors 100 and 102 may be appropriately positioned and woven around the storage elements 10, 12 and 14 to establish the recording regions such as 96, 97, 98 and 99. During reading, sensed signals are induced in the leads 100 and 102 which are applied to suitable circuits such as the respective coupling circuits 106 and 108 and in turn through respective leads 110 and 111 and leads 112 and 113 to a sense amplifier circuit 114. During writing, control currents are applied through the conductors 100 and 102 from the coupling circuits 106 and 108 in response to signals applied from a control pulse source 116 through respective leads 118 and 120. The conductors 100 and 102 may be positioned with each adjacent horizontal segment on opposite sides of the storage elements 10, 12 and 14 so that the conductors have a consistent polarity relation relative to the storage lines. It is to be noted that in one arrangement in accordance with this invention, the coupling circuits 106 and 108 may include transformers (not shown) each having first windings coupled between the conductors 100 and 102 and ground and having second windings respectively coupled to the leads 110 and 111 and the leads 112 and 113. The control pulses for writing may be applied through the leads 118 and 120 to center taps of the second windings.

Referring also to FIG. 2, the woven array 8 of FIG. 1 may be constructed and maintained around a plate 103 formed of any suitable structural material such as aluminum or plastic having rounded edges 105 and 107 and flat ends 109 and 111. The plate 103 may have other configurations such as being oval shaped looking from the end thereof. The first step in forming the memory array is to spin the storage conductors such as 22 around the magnetic wire such as the storage line 16 to form the storage elements. The storage element wire with the woven conductor may then be wound around the circumference of a cylinder (not shown) having an adhesive material on the surface such as a polyethylene or epoxy that may be cured by thermal processing. If the magnetic orientation is to be provided by axial tension of the magnetic wire in accordance with the invention, the continuous storage line, with conductor wound therearound, is positioned around the cylinder with a desired tension. A coating of similar adhesive material is then positioned on top of the helical wound storage line. The cylinder then may be thermally processed so the storage lines are permanently positioned under axial tension conditions. The layer of storage lines and processed material is then cut along the surface of the cylinder parallel to the axis thereof and removed from the surface of the cylinder to form sheets such as 113 which are sufficiently flexible for being positioned on the plate 103.

To provide the winding arrangement of FIG. 1, those conductors on the bottom of the storage elements are first woven around the plate 103 in directions parallel to the edges 105 and 107 and in correct positions. The winding of the conductor wires may be continuous as the slight change of axial position between the different storage elements does not affect the system operation. The sheets such as 113 containing the storage elements are then positioned on opposite sides of the plate 103 so that the storage elements extend in directions parallel to the ends 109 and 111. The conductor wire segments shown on the opposite side of the storage elements in FIG. 1 from those first positioned around the plate 103 are then continuously woven around the plate 103 parallel to the edges 105 and 107 and in appropriate positions. Any suitable pressure sensitive adhesive may, in some arrangements, be applied to the wires on the plate 103 and on the sheet 113 to maintain them in position. The conductors such as 42, 100 and 44 are then cut at the end 109 of the plate 103 and connections are made to terminals as shown at the end 109 to form the system of FIG. 1. The ends of wires may, in some winding operations, be connected to the terminals during the winding of the conductors so as to maintain the conductors in position. It is to be noted that the structure shown in FIG. 2 is only one assembly that may be utilized to form the memory system of FIG. 1 and other suitable arrangements may be utilized in accordance with the principles of the invention.

To generally explain the operation of the system of FIG. 1, a storage region such as 30 is selected to be of a sufficient length to maintain a stable magnetic domain of either a binary "one" shown by an arrow 120 or a binary "zero" shown by an arrow 122. The binary "zero" of the arrow 122 is a continuation of the magnetic domains of the adjacent biasing regions such as 34 and 36 so that magnetic domain walls are not established at the edges of the storage region. However, the binary "one" state of the arrow 120 establishes opposite magnetic poles and domain walls at the ends of the storage region 30. During reading, a current pulse is passed through the storage conductor such as 22 so that a propagating field of a polarity to change the magnetic state to a "zero" state but of insufficient intensity to establish a domain wall is applied to all storage regions of a selected storage element such as 10. Because a magnetic domain having walls (a "one" state in a storage region) may be collapsed and reversed in response to a smaller magnetic field than a magnetic domain without domain walls at the edge of the storage region (a "zero" state), the storage regions are all returned to a "zero" state during reading. Thus, when the storage regions are in the "zero" state at the end of a reading operation, one continuous magnetic domain is formed along the selected storage line such as 16. However, it is to be understood that because a magnetic field is only applied to the selected storage element during reading, a magnetic field larger than the propagating field may be applied thereto if desired to increase the switching speed.

During the writing operation, a current pulse is passed through a selected storage conductor such as 22 in a direction opposite of that during reading to develop a field capable of propagating the domain walls of a "one" state away from each other in the storage regions such as 30 and 32. The amplitude of the current pulse applied through the storage conductor 22 is selected to be of such a magnitude to provide domain propagation along the storage line 10 but to be sufficiently small so as not to provide switching or nucleation, that is, the formation of a nucleus or a magnetic segment from which the domain walls can develop or grow. Simultaneously, with the propagating field applied from the conductor 22, control switching pulses are applied to the conductors 100 and 102 to develop a switching field of a sufficient amplitude to establish a binary "one" state as a short magnetic domain in the recording regions such as 96 and 97 if a "one" is to be written therein. The short magnetic domain is of such a length that the magnetic retentivity thereof is incapable of supporting the magnetic state which is only maintained during the occurrence of the switching field. For example, to record a "one" in the storage region 30, a short magnetic domain of an arrow 130 is established in the recording region 96. The propagating field developed by the current passing through the storage conductor 22, which has a polarity in the direction for recording a binary "one" expands the magnetic domain walls at the ends of the arrow 130 along the entire storage area so that a binary "one" of the arrow 120 is recorded. In a unidirectional magnetic field (the propagating field), a domain wall formed by north poles moves in opposite directions from a domain wall formed by south poles. If a "zero" is to be recorded such as in the storage region 32, a signal is not applied to the lead 102 and the binary "zero" state remains unchanged because a short domain is not nucleated thereat. It is to be noted that at the start of the writing operation when all storage regions are in the "zero" state, there are no domain walls along the selected storage element so that propagation of magnetic domains only occur in response to the formation of the short unstable domains.

As the recording regions such as 96 and 98 are selected to be of lengths that are incapable of supporting a magnetic domain because the magnetomotive force developed by the retentivity of the material is insufficient to support the flux passing through the air between the poles, unselected storage lines such as 18 to which a propagating field is not applied are unaffected. After termination of the control pulse applied to the conductor 100, the magnetic domain of arrow 132 collapses or "snaps back" to the opposite magnetic state of an arrow 134 so that the entire storage region thereat is maintained in the "zero" state of the arrow 134. When a binary "one" is stored in a region such as shown by an arrow 136 in the storage line 20, the pulse applied to the conductor 100 develops a magnetic state indicated by an arrow 138, but being of the same state as the binary "one" of the arrow 136, the stored condition is unaffected. Thus it can be seen that regardless of the amplitude of the control pulse applied to the conductor 100, stored magnetic states in unselected storage elements such as 12 and 14 are undisturbed because of the absence of a propagating field applied through the corresponding storage conductors, and essentially an infinite selection ratio is provided. In storage regions such as 32 in which a "zero" is to be recorded, only the propagating field is applied thereto which field has no effect on the existing stable magnetic domain of the arrow 123.

To further explain the "snap back" operation of the relatively short magnetic domains such as shown by the arrows 130 and 132, which have a relatively short distance between a pair of opposite magnetic poles, the flux which passes out of one of the poles through the air, for example, and returns at the other pole, requires a minimum magnetomotive force for support thereof. This magnetomotive force is derived from the magnetic retentivity of the material of the storage lines such as 16 and 18. Magnetic retentivity is that property of a ferromagnetic material which causes it to develop a magnetomotive force when magnetized in one direction, that opposes a change of the established magnetic state when subject to external magnetic forces. For a given coercivity and diameter of wire, as the length of the domain increases, the magnetomotive force available from the retentivity of the material increases directly as a function of the length of the material. However, the internal magnetomotive force necessary to support the flux outside of the wire does not increase proportionally with the distance between the poles as the major reluctance of the air is in the regions of wire at the poles where the magnetic flux is most dense. As these dense regions of magnetic flux are further separated, the area of the flux path other than near the surface of the magnetic wire increases rapidly so that flux density is reduced in the air near the central regions of the domain. Although the path of the flux is relatively long when the poles are separated by a relatively long distance, much less magnetomotive force is required to support the flux in the central region than that required near the poles. Therefore, very little additional magnetomotive force is required to support flux passing through the large area near the middle of the domain when the domain length is increased.

When the magnetic domain is of a certain minimum length, the magnetomotive force developed from the retentivity of the material is sufficient to support the external flux and a stable magnetic domain is established. If the length of the domain is less than this minimum length and is in a magnetized region of opposite polarity, the domain "snaps back" or collapses when the magnetic field forming the domain is removed. For example, a wire 0.001 inch in diameter, such as an annealed wire of 70 percent nickel with the balance iron and impurities, having a coercivity of about 8 oersteds can just support a domain ⅛ inch long, but cannot support a domain 1/16 inch long. However, a nucleating coil 1/32 inch long may be utilized to initiate the growth of a domain. By utilizing a domain length of ¼ inch, for example, complete stability of the system is assured even in the presence of discontinuities occassionally encountered in commercially available wire. Thus, the short domains such as shown by the arrow 132 formed in all unselected magnetic storage lines such as 18 in regions of opposite "zero" state, collapse at the termination of the bit control pulse because the small magnets of the material are not supported.

Because in an oriented magnetic material, much less magnetomotive force will propagate a domain wall in the direction of orientation than is required to establish a magnetic domain in the direction of orientation, the propagating fields during writing and also during reading in some arrangements, are established within a range of magnitudes to provide propagation but not nucleation or development of magnetic states. It is to be noted that along the direction of orientation, the hysteresis loop of the oriented material during the propagation operation may be considered to have an I shape rather than a square shape. However, on a low frequency loop tracer apparatus, the hysteresis loop of the storage wire such as 16 may appear to have a substantially square or rectangular shape. This indication of a square shape results from a reduction of internal magnetomotive forces supporting the magnetic field due to the initial disordering of the elemental molecular magnets from their preferred position of orientation to some position at an angle thereto and the material rapidly changing magnetic state in response to an applied magnetic field of uniform amplitude.

For writing a binary "one," the domain forming field is generated by an additive combination of the propagating field and control switching field to cause nucleation in the recording region such as 96 and the formation of domain walls that are propagated away from the region of nucleation under the influence of the spatially extensive propagating fields. Because of the high speed of propagation of domain walls, a binary "one" may be recorded in a relatively short period of time. Actual domain wall velocities extend from nearly zero to 5,000 feet per second, with the latter speed being produced by fields very close to the magnitude required for nucleation. A propagation speed of 2,500 feet per second can be reliably produced with wide tolerance in current control. The nucleation time is usually small compared to the time required to establish the switching field in the control conductor such as 100, that is, the time required to overcome the capacitance and inductance of the circuit. The nucleation time can be as short as a few hundredths of a microsecond under sufficiently large nucleating fields.

Figure 3:
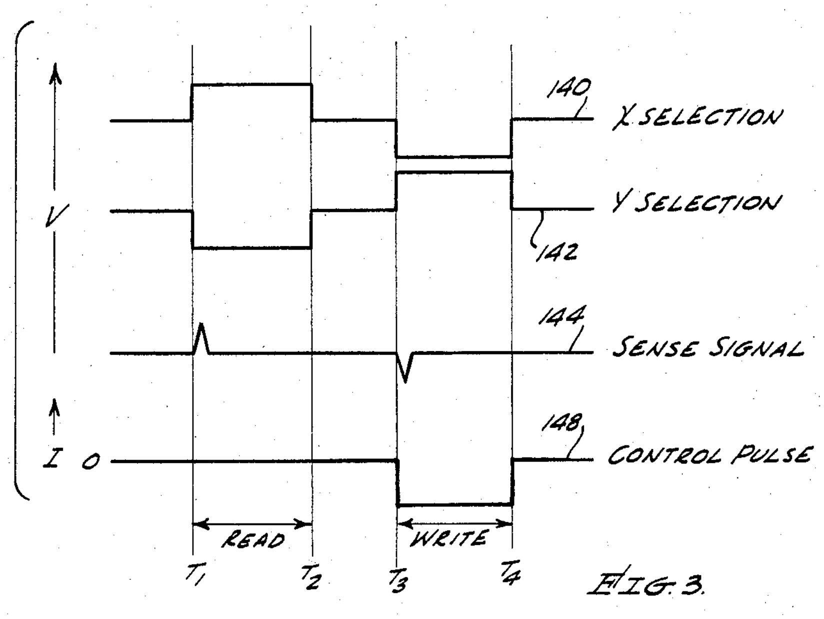
FIG. 3 is a schematic diagram of waveforms showing current and voltage as a function of time for further explaining the operation of the system of FIG. 1.

Referring now to the waveforms of FIG. 3 as well as to FIG. 1, the reading and writing operations will be explained in further detail in accordance with the invention. At a time $T_1$, positive and negative selection pulses of waveforms 140 and 142 are applied to respective X and Y selection leads 56 and 92 to pass a current pulse through the diode 60 and through the storage conductor 22. It is to be noted that unselected leads such as 66 and 64 have respectively negative and positive voltages maintained thereon to establish the diodes 72 and 70 in reverse biased condition so that leakage current is not passed through unselected storage conductors. Also a positive potential is maintained on the lead 54 so that the diode 58 is reverse biased. The utilization of diodes for a word organized selection arrangement is well known in the art and will not be explained in further detail. The magnetic propagating field developed by the current flowing through the selected storage conductor 22 is of sufficient amplitude to switch the domains of all storage regions 30 and 32 that are in a "one" state, which domains have domain walls at the edge of the storage region, to a "zero" state of the arrows 122 and 123. In response to a storage region in a "one" state being switched to a "zero" state, a pulse of a waveform 144 is inducted in the control conductors such as 100 and 102 and applied to the sense control circuits 114. If a storage region is storing a "zero" such as the region 32, the magnetic material is substantially undisturbed during reading and the stored state is indicated by the absence of a pulse on the control conductor such as 102. Unselected storage elements such as 12 and 14 are unaffected. The amplitude of the current pulse applied through the storage conductor 22 is only required to be sufficient to switch material in a "one" state of the arrow 120 which has magnetic domain walls at both ends, but as discussed previously may be as large as desired. The selected pitch of the helical storage conductors such as 22 also determines the desired magnetomotive force applied to the storage line such as 16. At time $T_2$, the selection pulses of the waveforms 140 and 142 are terminated and the read operation is completed. Between times $T_2$ and $T_3$, a period may be provided for recovery of the driving circuits such as the selection pulse sources 52 and 90.

At time $T_3$ which is the start of the write operation, negative and positive pulses of the waveforms 140 and 142 are respectively applied to the leads 54 and 92 to apply a current pulse through the selected storage conductor 22 in a direction opposite from that during the read operation. Biasing voltages are maintained on all unenergized leads such as 56, 64, 66 and 94 so that undesired currents do not flow through unselected storage conductors. The magnetic propagating field developed by the current flowing through the storage conductor 22, has a magnitude such that a domain wall will be moved or propagated in response thereto, but sufficiently small to be incapable of causing nucleation or establishment of a domain wall. In storage positions such as 30 in which a "one" is to be recorded, a pulse of a waveform 148 is applied to the corresponding control conductor such as 100. This current pulse of the waveform 148 when combined with a propagating field is of sufficient amplitude to establish a short magnetic domain of the arrow 130. The propagating field developed by current flowing through the storage conductor 122 is of such polarity that the opposite polarity magnetic domain walls of the arrow 130 move toward the ends of the storage region 30, and a stable "one" state is recorded therein. At time $T_4$, the control pulse of the waveform 148 is terminated as well as the selection pulses of the waveform 140 and 142, and the write operation is completed.

Because the short magnetic domains developed in unselected storage regions such as shown by the arrow 132 are not self-sustaining, they collapse at time $T_4$ and the "zero" state of the arrow 134 is maintained. For example, the time of collapsing may be less than one half of a microsecond when the length of the recording regions such as 98 is $\frac{1}{32}$ of an inch. In storage regions magnetized in the "one" state such as shown by an arrow 136 in the storage element 14 the short magnetic condition indicated by an arrow 138 has substantially no effect thereon. For recording a "zero" during the write operation such as in the storage region 32, a pulse of the waveform 148 is not applied to the conductor 102 and because magnetic domain walls are not present thereat, the stored state is not affected by the propagating field. The read and write operations may be continued in a similar manner and will not be explained in further detail. Thus it may be seen that even though control fields are applied to unselected storage elements during writing, a storage line is only permanently disturbed by having a propagating field applied thereto. During reading a propagating field is only applied to the selected storage line. Thus, in accordance with the invention, essentially an infinite selection ratio is provided because unselected storage elements may not be permanently disturbed.

The system of FIG. 1 may, for example, be formed of 0.001 inch magnetic wire for the storage lines such as 16 with the storage regions such as 30 being ¼ inch long and the recording regions such as 96 being $\frac{1}{32}$ inch long. The biasing regions such as 34 may be $\frac{1}{16}$ inch long. The length of the storage region and the recording region are selected by considering the diameter of the magnetic wire and the magnetic properties thereof such as coercivity and retentivity. It is to be noted that for any selected magnetic wire the system operation is principally dependent on the geometry of construction rather than on very close control of driving circuits.

Figure 4:
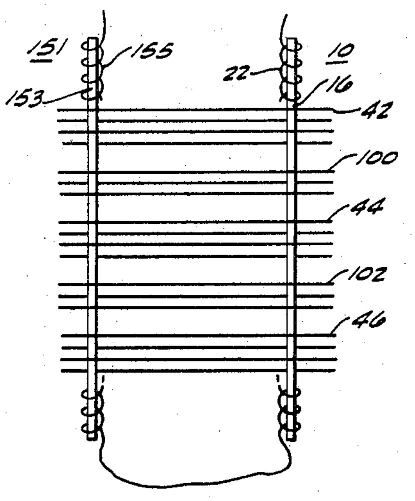
FIG. 4 is a schematic diagram showing a second arrangement in accordance with the invention for forming the memory system of FIG. 1.

Referring now to FIG. 4, another arrangement in accordance with principles of the invention includes a cancelling element 151 associated with each storage element such as 10. During reading, the current pulse passed through the selected storage conductor such as 22 may induce some undesired noise in the control conductors such as 100 and 102 because of the magnetic fields applied directly thereto. Thus the cancelling element may have a non magnetic core wire 153 formed of copper, for example, with the helical cancelling conductor 155 wound therealong in the opposite direction from the conductor 22. The storage conductor 22 and the cancelling conductor 155 are connected together at the lower ends thereof. The selection pulses are applied from the X and Y selection source 52 and 90 (FIG. 1) to the top ends of the respective conductors 22 and 155 in a manner similar to that of FIG. 1. Thus, when current pulses are passed through the conductors 22 and 155 in series, noise signals induced in the control conductors such as 100 and 102 by the propagating current are cancelled. Only the signal induced by the change of state of the storage regions remain uncancelled on the control conductors. It is to be noted that the arrangement of FIG. 4 is only to reduce sensed noise, and the system in accordance with the invention operates satisfactorily as shown in FIG. 1.

Thus there has been described a magnetic storage arrangement which combines the use of switching fields and propagating fields with an elongated magnetic medium magnetically oriented along the longitudinal length thereof. During reading, a propagating field is applied to only a selected word storage element. During writing, a propagating field is applied to only the selected word storage element and the bit control pulse has substantially no effect on unselected storage elements. The bit control pulse develops a magnetic domain of sufficiently short length that the domain "snaps back" or returns to the surrounding magnetic state at the termination of the control pulse. Therefore, the principles in accordance with this invention allow reliable and consistent selection without the high degree of current regulation required in conventional arrangements. Regardless of variations of write control driving currents, for example, or inconsistency of the parameters of the magnetic material, stored information may not be inadvertently destroyed with the system in accordance with this invention. The system has the advantage of being principally dependent on the geometry of spacing for reliable operation.

What is claimed is:

1. A storage element comprising
a magnetic medium having an axis and having a magnetic orientation substantially parallel to said axis, said medium having storage position therealong.
first means coupled to said medium for establishing magnetic regions of a first magnetic polarity at the ends of said storage positions,
second means coupled to said medium for selectively applying along said axis a first propagating field for reading, of said first polarity and a second propagating field for writing, of a second magnetic polarity opposite to the polarity of said magnetic regions,
third means coupled to said medium and including an information source for apply a switching field for writing, of said second polarity for establishing a domain being unstable in the absence of said switching field, along a portion of said storage position and that responds to said second propagating field to establish a stable domain of said second polarity along the length of said storage region, said stable domain of second polarity responding during reading to said first propagating field to establish a stable domain of a first polarity,
and sensing means coupled to said third means for responding to said magnetic regions changing to said first polarity in response to said first propagating field.

2. A storage element comprising
an elongated medium of a material having a magnetic retentivity and having an axis,
biasing means coupled to said medium for establishing fixed magnetic regions along said axis defining storage regions therebetween, each of said storage regions storing a first stable magnetic domain having domain walls at the ends thereof or a second stable magnetic state being a continuation of said fixed magnetic regions,
first means coupled to said medium for applying a first magnetic field along said axis during reading and for applying a second magnetic field along said axis during writing, said first field changing said first magnetic domain to said second magnetic domain, said second magnetic field being of insufficient magnitude to establish a magnetic domain but of sufficient magnitude to propagate an established domain,
second means coupled to a portion of each of said regions for selectively writing into said magnetic regions by applying a switching field to a portion of said storage region to establish an unstable magnetic domain of a length along said axis so that the retentivity of said material is unable to support the domain in the absence of said switching field, said unstable domain responding to said second propagating field to expand along said storage region to form said first magnetic domain, and sensing means coupled to said second means for responding to said regions changing from said first to said second magnetic state during reading.

3. A storage device comprising a magnetic wire having a longitudinal axis and having a magnetic orientation substantially parallel to said axis, said wire having a plurality of storage positions along said wire for storing first or second stable magnetic domains respectively of first and second magnetic polarities, first means coupled to said wire for establishing magnetic regions of said first magnetic polarity at both ends of each of said storage positions, second means coupled substantially along the length of said wire for selectively applying substantially parallel to said axis during reading, a first field of said first polarity to change all of said magnetic regions to said first polarity and during writing a second field of said second magnetic polarity, said second field being of insufficient intensity to establish magnetic domains but of sufficient intensity to expand an established magnetic domain, third means coupled to a portion of the storage positions of said wire for selectively writing into said storage positions by applying switching fields to said positions of said second polarity for establishing substantially unstable domains along portions of said storage positions storing first domains, said unstable domains responding to said second propagating field to establish said second domains, and fourth means coupled to said third means for sensing during reading of said regions, changes from said first polarity to said second polarity.

4. A memory system comprising a plurality of storage wires of material having a magnetic retentivity, a conducting coil wound around each storage wire in a helical configuration, a plurality of first coil means each magnetically coupled to said plurality of storage wires at periodic intervals along the lengths thereof to establish storage regions therebetween, a plurality of second coil means each magnetically coupled to said plurality of storage wires along selected lengths of said storage regions, a source of current coupled to said first coil means for establishing magnetized bias regions in a first stable magnetic state, selection means coupled to each of said conducting coils for respectively applying during reading and writing, first and second current pulses in respectively opposite directions therethrough, said conducting coil responding to said first current pulses to apply a first magnetic field to the selected storage wire to change all of said storage regions to said first stable magnetic state, and responding to said second current pulse to apply a second magnetic field to said selected storage wire of a sufficient magnitude to propagate magnetic domain walls but of insufficient magnitude to establish a magnetic state, means coupled to said second coil means for selectively applying during writing, recording pulses to establish magnetic recording domains of the second state in storage regions in the first magnetic state so as to have domain walls at the ends thereof, said recording domains being of lengths to be incapable of sustaining the magnetic states thereof, said recording means expanding in the selected storage wire in response to said second magnetic field to establish stable magnetic domains in said second state, the magnetic recording domains established in storage regions of unselected storage wires collapsing at the termination of said recording pulses so that the magnetic states thereof are not subject to permanent disturbance, and sensing means coupled to said second coil means for responding to said storage regions changing to the first magnetic state in selected wires.

References Cited

UNITED STATES PATENTS

| | | | |
|---|---|---|---|
| 3,154,766 | 10/1964 | Brittmann | 340—174 |
| 3,154,768 | 10/1964 | Hardwick | 340—174 |
| 3,264,621 | 8/1966 | Gray | 340—174 |
| 3,286,242 | 11/1966 | Gianola | 340—174 |

OTHER REFERENCES

Keefe, G.E.: "Non-Coincident Selection of Designated Locations Using Thin Films," IBM Technical Disclosure Bulletin, October, 1961, volume 4, No. 5 p. 34.

BERNARD KONICK, *Primary Examiner.*

M. S. GITTES, *Assistant Examiner.*